(12) United States Patent
Chai et al.

(10) Patent No.: US 10,623,530 B2
(45) Date of Patent: Apr. 14, 2020

(54) DEVICE FOR SUPPORTING COMMUNICATION BETWEEN MULTIPLE TYPES OF SAFETY CARRIERS AND COMMUNICATION METHOD THEREFOR

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Wei Guo, Shanghai (CN); Yu Zhou, Shanghai (CN); Chengqian Chen, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 414 days.

(21) Appl. No.: 14/899,419

(22) PCT Filed: Jun. 25, 2014

(86) PCT No.: PCT/CN2014/080680
§ 371 (c)(1),
(2) Date: Dec. 17, 2015

(87) PCT Pub. No.: WO2014/206284
PCT Pub. Date: Dec. 31, 2014

(65) Prior Publication Data
US 2016/0173652 A1    Jun. 16, 2016

(30) Foreign Application Priority Data

Jun. 28, 2013  (CN) .......................... 2013 1 0265687

(51) Int. Cl.
*H04L 29/06*    (2006.01)
*H04W 4/80*    (2018.01)
*H04W 80/08*    (2009.01)

(52) U.S. Cl.
CPC .............. *H04L 69/08* (2013.01); *H04L 69/18* (2013.01); *H04W 4/80* (2018.02); *H04W 80/085* (2013.01)

(58) Field of Classification Search
CPC ..... H04W 4/008; H04W 80/085; H04W 4/80; H04L 69/08; H04L 69/18
(Continued)

(56) References Cited

U.S. PATENT DOCUMENTS 7,133,416 B1 * 11/2006 Chamdani ............... H04L 12/66
  370/466
7,596,623 B2 * 9/2009 Przybylski .............. H04L 29/06
  709/230

(Continued)

FOREIGN PATENT DOCUMENTS

CN    101540804 A    9/2009
CN    102223731 A    10/2011
(Continued)

OTHER PUBLICATIONS

Sophia Antipolis Cedex, "Smart Cards; UICC—Contactless Front-end (CLF) Interface; Host Controller Interface (HCI) (Release 7); ETSI TS 102 622", ETSI Standard, European Telecommunications Standards Institute (ETSI), France, vol. SCP-T, No. V7.3.01, Jan. 1, 2009, XP014042882.

*Primary Examiner* — Vivek Srivastava
*Assistant Examiner* — Binod J Kunwar
(74) *Attorney, Agent, or Firm* — The Ollila Law Group LLC (57) ABSTRACT

A device and method for supporting communication between various types of secure elements is provided. The device comprises a protocol converter, and the protocol converter comprises: a plurality of communication interfaces for correspondingly coupling with each type of secure element; and a management module coupled with each
(Continued)

communication interface; wherein different types of secure elements follow different bottom level communication protocols, each communication interface is configured to follow the same bottom level communication protocol as the secure element it correspondingly couples with; the management module is configured to follow the same upper level communication protocol so as to realize a protocol conversion between any bottom level communication protocol and the upper level communication protocol, and the management module is used for dynamically establishing a connection channel for any two of the communication interfaces, thus realizing a corresponding communication between the secure elements of any two different types.

19 Claims, 3 Drawing Sheets (58) Field of Classification Search
USPC .......................................... 709/230; 710/11
See application file for complete search history.

(56) References Cited

U.S. PATENT DOCUMENTS

| | | | | |
|---|---|---|---|---|
| 7,668,144 B2* | 2/2010 | Taylor | ............... | H04L 29/06 370/338 |
| 8,028,078 B2* | 9/2011 | Roy | ............... | H04L 51/066 709/227 |
| 8,265,553 B2* | 9/2012 | Cheon | ............... | H04M 1/72527 361/679.4 |
| 8,265,555 B2* | 9/2012 | Steeger | ............... | A61M 16/0816 455/193.2 |
| 8,626,979 B2* | 1/2014 | Wang | ............... | G06F 13/387 709/230 |
| 8,971,312 B2* | 3/2015 | Moore | ............... | H04L 29/06 370/352 |
| 9,661,448 B2* | 5/2017 | Charles | ............... | G06K 7/10237 |
| 2005/0038915 A1* | 2/2005 | Clarke | ............... | H04L 67/04 709/250 |
| 2008/0040521 A1* | 2/2008 | Sakai | ............... | H04L 69/08 710/105 |
| 2008/0076475 A1* | 3/2008 | Kim | ............... | G06K 7/10237 455/558 |
| 2008/0081631 A1* | 4/2008 | Rofougaran | ............... | H01Q 1/38 455/452.1 |
| 2008/0090595 A1* | 4/2008 | Liu | ............... | H04L 63/102 455/461 |
| 2008/0144650 A1* | 6/2008 | Boch | ............... | G06K 7/0008 370/464 |
| 2009/0113064 A1* | 4/2009 | Yamaki | ............... | H04L 69/08 709/230 |
| 2009/0191811 A1* | 7/2009 | Griffin | ............... | G06Q 20/322 455/41.1 |
| 2009/0327528 A1* | 12/2009 | Mardiks | ............... | G06F 13/4068 710/11 |
| 2010/0190437 A1* | 7/2010 | Buhot | ............... | H04B 5/06 455/41.1 |
| 2011/0055901 A1* | 3/2011 | Karaoguz | ............... | G06F 21/10 726/4 |
| 2011/0087804 A1* | 4/2011 | Okaue | ............... | G06F 1/26 710/5 |
| 2012/0052801 A1* | 3/2012 | Kulkarni | ............... | G06K 7/0008 455/41.1 |
| 2012/0069742 A1* | 3/2012 | Kaufmann | ............... | H04L 41/022 370/242 |
| 2012/0110200 A1* | 5/2012 | Ahn | ............... | H04W 80/045 709/230 |
| 2013/0015140 A1 | 1/2013 | Oleg | | |
| 2013/0254328 A1* | 9/2013 | Inoue | ............... | H04L 29/08 709/217 |
| 2013/0336426 A1* | 12/2013 | Tudosie | ............... | G06K 19/072 375/316 |
| 2014/0021799 A1* | 1/2014 | Sankararamalingam | ............... | H04B 5/0037 307/104 |
| 2014/0036923 A1* | 2/2014 | Takase | ............... | H04L 12/5601 370/392 |
| 2014/0075061 A1* | 3/2014 | Fritchman | ............... | G06F 1/1632 710/62 |
| 2014/0149599 A1* | 5/2014 | Krishna | ............... | H04L 67/18 709/232 |
| 2014/0273823 A1* | 9/2014 | O'Sullivan | ............... | G06Q 20/3278 455/41.1 |
| 2014/0310436 A1* | 10/2014 | Du | ............... | G06F 13/362 710/110 |

FOREIGN PATENT DOCUMENTS

| | | |
|---|---|---|
| CN | 102609840 A | 7/2012 |
| CN | 102694582 A | 9/2012 |
| EP | 2360987 A1 * | 8/2011 |

* cited by examiner

DEVICE FOR SUPPORTING COMMUNICATION BETWEEN MULTIPLE TYPES OF SAFETY CARRIERS AND COMMUNICATION METHOD THEREFOR

FIELD OF THE INVENTION

The invention pertains to the technical filed of secure information interaction, and relates to communication interaction between different types of secure elements (SE), and in particular to a device and method for supporting communication between various types of secure elements.

BACKGROUND

The secure element is an independent hardware module or a virtual software module having a computing and storing function, in which various hardware and/or software modules are designed so as to protect the security of the data stored therein and to provide a corresponding secure mechanism service for use by external devices; specifically, the SE may comprise elements having a real physical hardware such as a SIM card, a smart SD (SSD) card, a near field communication (NFC) chip or the like, and also virtualized elements, i.e., virtual secure elements.

Taking a current cell-phone terminal as an example, when it is in interactive communication with a secure apparatus terminal, a secure element (e.g., SSD card) or the like embedded in the cell-phone itself is used to provide a corresponding communication secure mechanism service and a corresponding secure storage and access function, etc. However, since these secure elements can not communicate with external terminals directly, a client program has to be developed on the cell-phone terminal if it is required for these secure elements to interact with the external terminals, wherein the application program on the secure element can be only a service program used for the client program, which makes these secure elements be only used for one type of mobile terminal (i.e., cell-phone), thus greatly limiting the flexibility, expandability and diversity of secure element applications.

In addition, with the development of the market and as required by various industries, many types of SEs are equipped in the cell-phone terminal, which is also an inevitable situation. Examples are existing SIM card and SSD card currently in the market. However, when there are different types of SEs, there are currently no corresponding solutions for mutual communication between these different types of SEs and corresponding mutual services.

SUMMARY OF THE INVENTION

The object of the invention is to achieve a communication between various different types of SEs so as to expand the flexibility, expandability and diversity of each SE application.

In order to achieve the above and other objects, the invention provides the following technical solution.

According to an aspect of the invention, a device for supporting communication between various types of secure elements is provided, which comprises a protocol converter, the protocol converter comprising:

a plurality of communication interfaces for correspondingly coupling with each type of secure element; and a management module coupled with each communication interface;

wherein different types of secure elements follow different bottom level communication protocols, each communication interface is configured to follow the same bottom level communication protocol as the secure element it correspondingly couples with;

the management module is configured to follow the same upper level communication protocol so as to realize a protocol conversion between any bottom level communication protocol and the upper level communication protocol, and the management module is used for dynamically establishing a connection channel for any two of the communication interfaces, thus realizing a corresponding communication between the secure elements of any two different types.

In the device according to an embodiment of the invention, the secure elements of any two different types that communicate with each other comprise a first secure element that actively initiates the communication connection and a second secure element that passively accepts the communication connection, and the first secure element is configured with a first upper level communication protocol layer so as to realize a protocol conversion between the bottom level communication protocol followed by the first secure element and the upper level communication protocol.

Preferably, each of the secure elements is provided with a first bottom level communication protocol layer for following a corresponding bottom level communication protocol;

each communication interface is provided with a second bottom level communication protocol layer corresponding to a first bottom level communication protocol layer of a correspondingly coupled secure element;

the management module is provided with a plurality of second upper level communication protocol layers; and each second upper level communication protocol layer is used for realizing a protocol conversion between the bottom level communication protocol and the upper level communication protocol.

Preferably, the first secure element is based on a corresponding first upper level communication protocol layer, a first bottom level communication protocol layer, a second bottom level communication protocol layer and a second upper level communication protocol layer for realizing the establishment of communication connection with the management module.

Preferably, the second secure element is based on a corresponding first bottom level communication protocol layer, a second bottom level communication protocol layer and a second upper level communication protocol layer for realizing the establishment of communication connection with the management module.

In the device according to another embodiment of the invention, the first secure element sends a request command for requesting the establishment of the connection channel, and the management module establishes the corresponding connection channel according to the second secure element specified in the request command.

Preferably, the management module assigns a channel identifier for the connection channel and returns the channel identifier to the corresponding first secure element.

In the device according to further another embodiment of the invention, after the connection channel is established, the application command data sent by the first secure element is converted via the first upper level communication protocol layer into data that can be transmitted via a communication interface corresponding to the first secure element, and the converted data is transmitted to the protocol converter via the communication interface, wherein the management module of the protocol converter converts the application command data into data that can be transmitted via a communication interface corresponding to the second secure element based on the established connection channel, and transmits the converted data to the second secure element via the communication interface for processing;

after being processed by the second secure element, the returned application return data is transmitted to the protocol converter via a communication interface corresponding to the second secure element, wherein the management module of the protocol converter converts the application return data into data that can be transmitted via a communication interface corresponding to the first secure element based on the established connection channel, and transmits the converted data to the first secure element via the communication interface, and the first secure element resolves the application return data via the first upper level communication protocol layer.

Preferably, the application command data sent by the first secure element is packaged into a first level message data by the first upper level communication protocol layer thereof according to the upper level communication protocol, and the first level message data is sent to the first bottom level communication protocol layer of the first secure element;

the first bottom level communication protocol layer packages the first level message data into bottom level message data according to the bottom level communication protocol and sends the bottom level message data to a corresponding communication interface;

the second bottom level communication protocol layer of the communication interface receives the bottom level message data and converts it into a corresponding first level message data, and sends the first level message data to the corresponding second upper layer communication protocol layer of the management module;

the second upper layer communication protocol layer resolves the received first level message data to identify the connection channel, and transmits the first level message data to another corresponding second upper level communication protocol layer in the connection channel via the connection channel;

the second upper level communication protocol layer transmits at least a part of the received first level message data to the second bottom level communication protocol layer of the communication interface corresponding to the second secure element;

the second bottom level communication protocol layer packages the received first level message data into bottom level message data according to the bottom level communication protocol followed by the second secure element, and sends the bottom level message data to the first bottom level communication protocol layer of the second secure element;

the first bottom level communication protocol layer resolves the application command data from the bottom level message data for processing by the second secure element;

after processing, the second secure element sends the application return data to the first bottom level communication protocol layer thereof;

the first bottom level communication protocol layer packages the received application return data into bottom level message data according to the bottom level communication protocol it follows, and sends the bottom level message data to a corresponding communication interface of the protocol converter;

the first bottom level communication protocol layer converts and packages the received bottom level message data into a first level message data and sends it to the second upper level communication protocol layer corresponding to the second secure element in the management module;

the second upper level communication protocol layer is resolved according to upper level communication protocol, and based on the connection channel, forwards the first level message data corresponding to the application return data to the second upper level communication protocol layer corresponding to the first secure element;

the second upper level communication protocol layer forwards the first level message data corresponding to the received application return data to the second bottom level communication protocol layer of the communication interface corresponding to the first secure element;

the second bottom level communication protocol layer packages the received first level message data into the bottom level message data according to the bottom level communication protocol it follows, and sends the bottom level message data to the first secure element;

the first bottom level communication protocol layer of the first secure element extracts the first level message data from the received bottom level message data and sends the first level message data to the first upper level communication protocol layer of the first secure element;

the upper level communication protocol layer resolves the application return data according to the upper level communication protocol for process by the first secure element.

In the device according to yet another embodiment of the invention, each of the communication interfaces is configured with a unique interface identifier, and each of the secure elements is configured with a device identifier, wherein a secure element identifier of each secure element is acquired by combining the device identifier of the secure element and the interface identifier of the communication interface its correspondingly couples with;

the connection channel is established at least through the secure element identifier and a communication among a plurality of secure elements of different types is realized.

Specifically, the secure element comprises a dynamically pluggable secure element, and the device comprises a secure element detection module for dynamically and uniformly identifying each dynamically pluggable secure element.

Preferably, the secure element detection module is coupled with one or more communication interfaces corresponding to the dynamically pluggable secure element, and the secure element detection module is configures with one or more secure element list;

when the secure element detection module detects the dynamically pluggable secure element is connected from any of the communication interfaces, the information of the secure element is sent to the secure element detection module and stored in an empty list item of the secure element list corresponding to the communication interface, wherein the number of the list item is defined as the device identifier of the secure element;

when the secure element detection module detects the dynamically pluggable secure element is removed or disconnected from any of the communication interfaces, the communication interface sends the information of the secure element to the secure element detection module, and finds the correspond list item in the secure element list corresponding to the communication interface based on the information of the secure element, and the secure element identifier of the secure element is deleted by deleting the list item.

Specifically, the communication interfaces can be 7618 interface, SD interface, NFC interface or I2C interface, and the bottom level communication protocol can be 7618 protocol, SD protocol, NFC protocol or I2C protocol.

Specifically, the upper level communication protocol can be HCP protocol.

In the device according to any of the above embodiment, preferably, the device operates in a secure mode or a secure operating system.

Specifically, the secure mode or the secure operating system is a secure operating environment built based on TrustZone technology.

According to another method of the invention, a communication method between secure elements based on the above described device comprises:

a connection channel establishing step: the first secure element sends a request command for requesting the establishment of the connection channel, and the management module establishes the corresponding connection channel according to the second secure element specified in the request command;

an application command data sending step: the application command data sent by the first secure element is converted via the first upper level communication protocol layer into data that can be transmitted via a communication interface corresponding to the first secure element, and the converted data is transmitted to the protocol converter via the communication interface, wherein the management module of the protocol converter converts the application command data into data that can be transmitted via a communication interface corresponding to the second secure element based on the established connection channel, and transmits the converted data to the second secure element via the communication interface for processing;

an application return data returning step: after the second secure element at least processes the application command data, the application return data that needs to be returned is transmitted to the protocol converter via a communication interface corresponding to the second secure element, wherein the management module of the protocol converter converts the application return data into data that can be transmitted via a communication interface corresponding to the first secure element based on the established connection channel, and transmits the converted data to the first secure element via the communication interface, and the first secure element resolves the application return data via the first upper level communication protocol layer.

In the communication method between secure elements according to an embodiment of the invention, the application command data sending step comprises the following steps:

S11 and S12: the application command data sent by the first secure element is packaged into a first level message data by the first upper level communication protocol layer thereof according to the upper level communication protocol, and the first level message data is sent to the first bottom level communication protocol layer of the first secure element;

S13: the first bottom level communication protocol layer packages the first level message data into bottom level message data according to the bottom level communication protocol and sends the bottom level message data to a corresponding communication interface;

S14: the second bottom level communication protocol layer of the communication interface receives the bottom level message data and converts it into a corresponding first level message data, and sends the first level message data to the corresponding second upper layer communication protocol layer of the management module;

S15: the second upper layer communication protocol layer resolves the received first level message data to identify the connection channel, and transmits the first level message data to another corresponding second upper level communication protocol layer in the connection channel via the connection channel;

S16: the second upper level communication protocol layer transmits at least a part of the received first level message data to the second bottom level communication protocol layer of the communication interface corresponding to the second secure element;

S17: the second bottom level communication protocol layer packages the received first level message data into bottom level message data according to the bottom level communication protocol followed by the second secure element, and sends the bottom level message data to the first bottom level communication protocol layer of the second secure element;

S18: the first bottom level communication protocol layer resolves the application command data from the bottom level message data for processing by the second secure element.

In the communication method between secure elements according to another embodiment of the invention, the application return data returning step comprises the following steps:

S21: after processing, the second secure element sends the application return data to the first bottom level communication protocol layer thereof;

S22: the first bottom level communication protocol layer packages the received application return data into bottom level message data according to the bottom level communication protocol it follows, and sends the bottom level message data to a corresponding communication interface of the protocol converter;

S23: the first bottom level communication protocol layer converts and packages the received bottom level message data into a first level message data and sends it to the second upper level communication protocol layer corresponding to the second secure element in the management module;

S24: the second upper level communication protocol layer resolves the first level message data according to upper level communication protocol, and based on the connection channel, forwards the first level message data corresponding to the application return data to the second upper level communication protocol layer corresponding to the first secure element;

S25: the second upper level communication protocol layer forwards the first level message data corresponding to the application return data to the second bottom level communication protocol layer of the communication interface corresponding to the first secure element;

S26: the second bottom level communication protocol layer packages the received first level message data into the bottom level message data according to the bottom level communication protocol it follows, and sends the bottom level message data to the first secure element;

S27: the first bottom level communication protocol layer of the first secure element extracts the first level message data from the received bottom level message data and sends the first level message data to the first upper level communication protocol layer of the first secure element;

S28: the upper level communication protocol layer resolves the application return data according to the upper level communication protocol for use by the first secure element.

Preferably, each of the communication interfaces is configured with a unique interface identifier, and each of the secure elements is configured with a device identifier, wherein a secure element identifier of each secure element is acquired by combining the device identifier of the secure element and the interface identifier of the communication interface its correspondingly couples with;

the connection channel is established at least through the secure element identifier and a communication among a plurality of secure elements of different types is realized.

Specifically, the secure element comprises a dynamically pluggable secure element, and the device comprises a secure element detection module for dynamically and uniformly identifying each dynamically pluggable secure element.

Preferably, the secure element detection module is coupled with one or more communication interfaces corresponding to the dynamically pluggable secure element, and the secure element detection module is configures with one or more secure element list;

when the secure element detection module detects the dynamically pluggable secure element is connected from any of the communication interfaces, the information of the secure element is sent to the secure element detection module and stored in an empty list item of the secure element list corresponding to the communication interface, wherein the number of the list item is defined as the device identifier of the secure element;

when the secure element detection module detects the dynamically pluggable secure element is removed or disconnected from any of the communication interfaces, the communication interface sends the information of the secure element to the secure element detection module, and finds the correspond list item in the secure element list corresponding to the communication interface based on the information of the secure element, and the secure element identifier of the secure element is deleted by deleting the list item.

Preferably, the method operates in a secure mode or a secure operating system.

The invention can achieve the following technical effects: a communication connection between any two types of secure elements can be realized, thus greatly expanding the communicability of each secure element and reducing the dependence of application programs of the secure element on mobile device. Moreover, the independence of application programs is improved, and collaboration between industries is greatly facilitated, thus enhancing the flexibility and adaptability of the entire application development and thereby improving the flexibility, expandability and diversity of application programs of the secure element.

BRIEF DESCRIPTION OF THE DRAWINGS

The above and other objects and advantages of the invention will become more complete and clear from the following detailed description with reference to the accompanying drawings, wherein identical or similar elements are denoted by identical reference signs.

DETAILED DESCRIPTION OF THE UTILITY MODEL

Some of the many possible embodiments of the invention will be described below with the purpose of providing a basic understanding of the invention rather than identifying key elements or crucial elements of the invention or limiting the scope of protection. It can be understood that according to the technical solution of the invention, those skilled in the art can propose other alternative implementations without departing from the true spirit of the invention. Therefore, the following specific embodiments and accompanying drawings are merely exemplary description of the technical solutions of the invention, and should not be taken as the entirety of the invention or considered as defining or limiting the technical solution of the invention.

In the following embodiments, an example is described in which an internal communication between various SEs in a cell-phone is realized based on an ARM chip using TrustZone technology. In this way, internal SEs can provide service to each other. The TrustZone technology can create a corresponding secure operating environment so as to ensure various devices of the invention can operate in a secure mode or in a secure operating system.

The TrustZone technology is a technology proposed by ARM company in which a measure for enhancing system security begins from the design of CPU core and is integrated into an overall design of the system. The TrustZone technology integrates protection measure into the core so as to ensure the safety of the entire operating system, and meanwhile provides a secure software platform which enables semiconductor manufacturers, OEMs and operating system cooperative partners to expand and develop there own secure solutions. For further description of the TrustZone technology, please log onto the following website: http://www.arm.com/zh/products/processors/technologies/trustzone.php Herein, the secure element (SE) is an independent hardware module or a virtual software module having a computing and storing function, in which various hardware and/or software modules are designed so as to protect the security of the data stored therein and to provide a corresponding secure mechanism service for use by external devices; specifically, the SE may comprise elements having a real physical hardware such as a SIM card, a smart SD (SSD) card, a near field communication (NFC) chip or the like, and also virtualized elements, i.e., virtual secure elements. The type of SE is mainly divided by the type of the bottom level communication protocol it follows. The specific type of SE is not limiting, and can be any type of SE, including the type of SE that may arise in the future.

Figure 1:
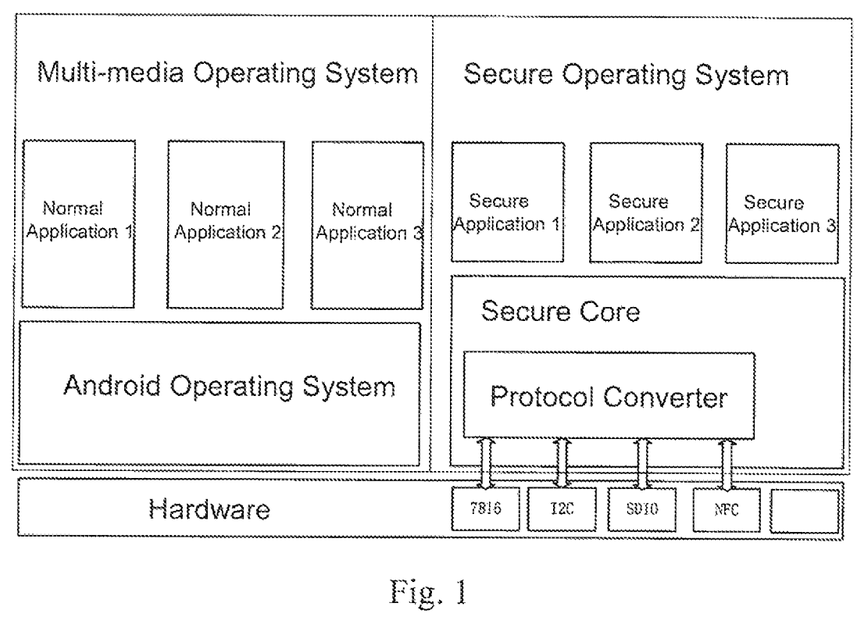
FIG. 1 is a schematic view showing the framework of an operating system of a cell-phone mobile terminal.

FIG. 1 is a schematic view showing the framework of an operating system of a cell-phone mobile terminal. The operating system of cell-phone comprises a multi-media operating system and a secure operating system. By way of example, the multi-media operating system can run various normal applications (e.g., normal application 1, normal application 2 and normal application 3) based on Android system, and the secure operating system can run various secure applications (e.g., secure application 1, secure application 2 and secure application 3) based on secure core, wherein the secure core uses a protocol converter, and a plurality of hardware SEs (e.g., SE based on 7816 communication protocol, SE based on I2C communication protocol, SE based on SDIO communication protocol, SE based on NFC communication protocol, etc) in the cell-phone communicates with the protocol converter.

Figure 2:
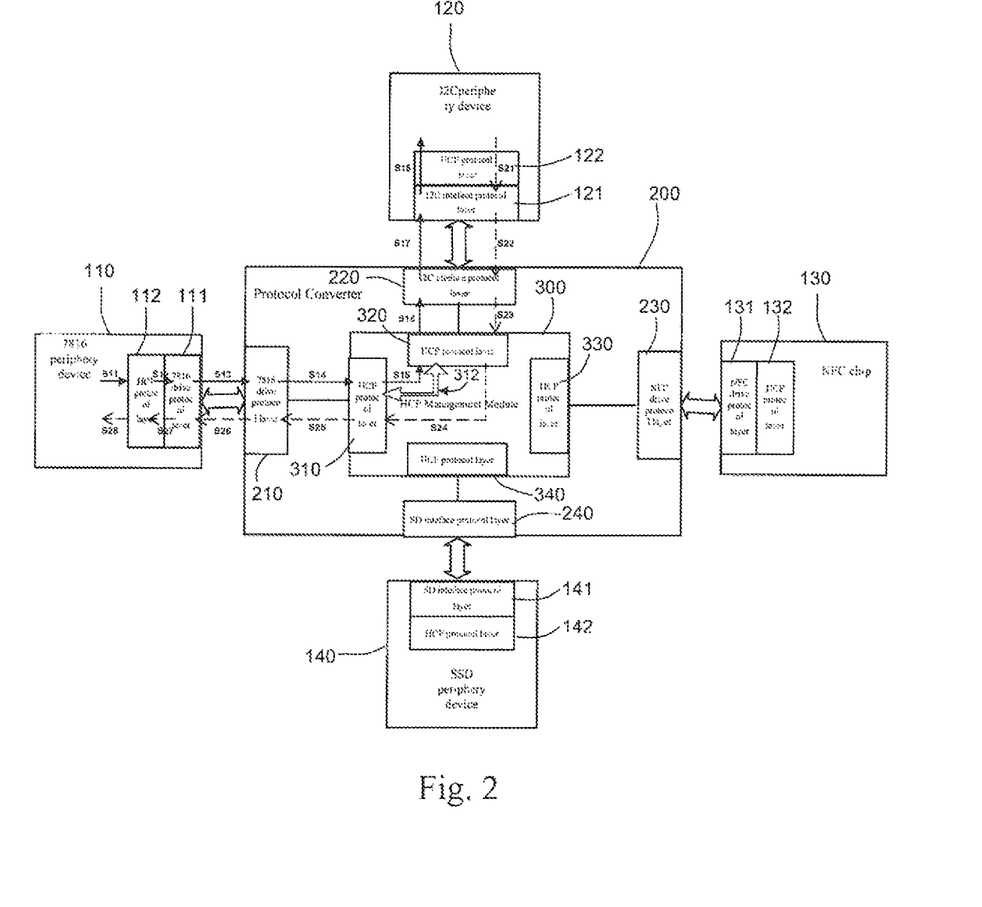
FIG. 2 is a schematic view showing the module structure of a device for supporting communication between various types of secure elements according to an embodiment of the invention.

FIG. 2 is a schematic view showing the module structure of a device for supporting communication between various types of secure elements according to an embodiment of the invention. In this embodiment, there can be various types of SEs in the cell-phone, and the SEs specifically comprise but are not limited to 7816 periphery device 110, I2C periphery device 120, NFC chip periphery device 130 and SSD periphery device 140. Each SE is at least provided with a corresponding first bottom level communication protocol layer, e.g., 7816 periphery device 110 is correspondingly provided with 7816 drive protocol layer 111, I2C periphery device 120 is correspondingly provided with I2C interface protocol layer 121, the NFC chip periphery device 130 is correspondingly provided with NFC drive protocol layer 131, and the SSD periphery device 140 is correspondingly provided with SD interface protocol layer 141. Data transmitted by each first bottom level communication protocol layer can be directly read or processed by the corresponding SE.

The device of the invention comprises a protocol converter 200. In this embodiment, the protocol converter 200 is provided with four communication interfaces corresponding to 7816 periphery device 110, I2C periphery device 120, NFC chip periphery device 130 and SSD periphery device 140 respectively, wherein the four communication interfaces are respectively provided with corresponding 7816 drive protocol layer 210, I2C interface protocol layer 220, NFC drive protocol layer 230, and second bottom level communication protocol layer of SD interface protocol layer 240, for example. In this way, each communication interface of the protocol converter 220 and each SE can follow a corresponding bottom level communication protocol to transmit data. Specifically, 7816 drive protocol layer 210 and 7816 drive protocol layer 111 follow 7816 protocol to transmit data, I2C interface protocol layer 220 and I2C interface protocol layer 121 follow I2C protocol to transmit data, NFC drive protocol layer 230 and NFC drive protocol layer 131 follow NFC protocol to transmit data, and SD interface protocol layer 240 and SD interface protocol layer 141 follow SDIO protocol to transmit data.

It will be understood that the protocol converter 200 is not limited to the above described communication interfaces. For example, some other communication interfaces in some cell-phone mobile terminals can be also comprised, e.g., human-machine interface, and even a shared memory or the like applied for mutual communication in the application can be comprised.

With continued reference to FIG. 2, the protocol converter 200 comprises a management module 300, in which communication protocols above the bottom level communication protocol corresponding to each SEs is utilized as a HCP (Host Channel Protocol). The HCP is an upper level communication protocol at a higher level than the bottom level communication protocols (e.g., 7816 protocol, I2C protocol, NFC protocol and SDIO protocol). In order to achieve, the management module 300 is provided with a second upper level communication protocol layer corresponding to each SE. For example, 7816 periphery device 110 is correspondingly provided with HCP layer 310, I2C periphery device 120 is correspondingly provided with HCP layer 320, NFC chip periphery device 130 is correspondingly provided with HCP protocol layer 330, and SSD periphery device 140 is correspondingly provided with HCP protocol layer 340. In this way, a protocol conversion is conducted between each bottom level communication protocol and the same upper level communication protocol. The data received or sent by the management module 300 is converted into a uniform message format.

In order to achieve mutual communication between individual communication interfaces, a connection channel between two parties has to be created in advance. The management module 300 is used for realizing a dynamic creation of these connection channels. After the management module 300 creates the connection channel, a peer to peer communication can be realized between different SE parties; and after the communication between the SE parties is completed, the management module 300 can perform a deletion of the connection channel.

In the following embodiments, a method and principle of realizing communication between any two SEs will be described in an example in which 7816 periphery device 110 is used as a first secure element for actively initiating communication connection, and I2C periphery device 120 is used as a second secure element for passively accepting the communication connection. When 7816 periphery device 110 is used as the first secure element for actively initiating communication connection, it is provided with HCP drive protocol layer 112. In this way, a direct conversion can be realized between 7816 drive protocol followed by 7816 periphery device 110 and HCP protocol. I2C periphery device 120 is stored therein with a corresponding SIM card application program.

With reference to FIG. 2, firstly, the SIM card application program in 7816 periphery device 110 indicates an identifier of the secure element of I2C periphery device 120 it has to access according to a channel creating command designated by HCP protocol, and sends a command to the HCP management module 300 for requesting the creation of the connection channel 312.

Further, after the management channel 300 receives the command, it tries to connect the device that is identified by the device identifier designated in the request command; if the connection is failed, an error is returned to the SIM card (i.e., 7816 periphery device 110), and if the connection is successfully, a channel identifier (i.e., channel ID) is assigned to this connection; assuming the ID is 0, this ID is returned to the SIM card application program.

In this way, the establishment of a connection channel between corresponding SE is completed. A communication between two SEs based on this connection channel will be further described below.

Step S11: application command data in the SIM card application program in 7816 periphery device 110 is sent to the HCP drive protocol layer 112.

Step S12: the HCP drive protocol layer 112 packages the application command data into HCP message data and transits it to the next layer, i.e., 7816 drive protocol layer 111.

Step S13: the 7816 drive protocol layer 111 packages the received HCP message data into bottom level message data according to 7816 protocol it follows and sends it to a corresponding communication interface of the protocol converter 200, i.e., the communication interface corresponding to 7816 drive protocol layer 210.

Step S14: 7816 drive protocol layer 210 extracts actual HCP message data from the received bottom level message data and sends it to the upper layer, i.e., the HCP protocol layer 310 of the management module 300.

Step S15: the HCP protocol layer 310 resolves data corresponding to this HCP protocol layer according to the HCP protocol, and then determines whether the resolved data is to be sent to I2C periphery device 120 according to the created connection channel 312 so that the resolved data is forwarded to the HCP protocol layer 320 corresponding to I2C interface protocol layer 220 based on this connection channel.

Step S16: the HCP protocol layer 320 packages the above resolved data into HCP message data and sends it to a corresponding next layer, i.e., I2C interface protocol layer 220.

Step S17: I2C interface protocol layer 220 packages the received HCP message data into bottom level message data according to the I2C protocol it follows, and sends it to I2C periphery device 120.

Step S18: the I2C interface protocol layer 121 of I2C periphery device 120 resolves application command data from the received bottom level message data for process by I2C periphery device, and the corresponding application program on the I2C periphery device thus can process application command data transmitted from 7816 periphery device.

Step S21: after the corresponding application program on the I2C periphery device 120 processes the application command data, the generated application command data is sent to the I2C interface protocol layer 121.

Step S22: the I2C interface protocol layer 121 packages the received application return data into bottom level message data according to the I2C protocol it follows and sends it to the corresponding communication interface of the protocol converter 200, i.e., the communication interface corresponding to the I2C interface protocol layer 210.

Step S23: the I2C interface protocol layer 210 converts and packages the received bottom level message data into HCP message data according and sends it to the upper level, i.e., the HCP protocol layer 320 of the management module 300.

Step S24: the HCP protocol layer 320 resolves data corresponding to this HCP protocol layer according to the HCP protocol, and then forwards the resolved data to the HCP protocol layer 310 corresponding to 7816 drive protocol layer 210 based on the connection channel 312.

Step S25: the HCP protocol layer 310 packages the resolved data into HCP message data and sends it to the corresponding next layer, i.e., 7816 drive protocol layer 210.

Step S26: 7816 drive protocol layer 210 packages the received HCP message data into bottom level message data according to the 7816 protocol it follows and sends it to 7816 periphery device 110.

Step S27: the 7816 drive protocol layer 111 of 7816 periphery device 110 extracts actual HCP message data from the received bottom level message data and sends it to the upper layer, i.e., the HCP protocol layer 112 of 7816 periphery device 110.

Step S28: the HCP protocol layer 112 resolves actual application return data according to the HCP protocol and sends it to the SIM card application program.

Hitherto, a peer to peer communication process between 7816 periphery device 110 and I2C periphery device 210 is completed. As can be seen from the above, after the connection channel is established, steps S11 to S18 are in a communication transmission phase of application command data, and steps S21 to S28 are in a communication transmission phase of application return data. Moreover, it is understood that the above steps S11 to S18 and steps S21 to S28 can be executed repeatedly and continuously based on the same connection channel.

As can be seen from the above, the HCP protocol 112 only performs its function at a communication party (i.e., 7816 periphery device 110 of the first secure element) which actively initiates communication connection, and the HCP protocol layer (e.g. 122) in the second secure element (e.g., I2C periphery device 120) that passively accepts the communication connection does not perform function, i.e., the second secure element that passively accepts the communication connection can not sense the HCP protocol. That is, the party which actively initiates communication connection needs to use the HCP protocol, while the party that passively accepts service (i.e., the second secure element that passively accepts the communication connection) does not need to use the HCP protocol, Therefore, the current entire application environment can be well compatible, and the corresponding SE does not need to actively initiate communication connection and the protocol structure of its own needs not to be modified.

Of course, in other embodiments, if both parties have to actively communicate with each other, two HCP channels have to be established between the two parties. For example, if I2C periphery device 120 has to be the first secure element which actively initiates communication connection, a HCP protocol layer 122 is also required to be provided in I2C periphery device 120, which performs similar function to the HCP protocol layer 122 in 7816 periphery device 110.

In the device of the embodiment shown in FIG. 2, each of 7816 periphery device 110, I2C periphery device 120, NFC chip periphery device 130 and SSD periphery device 140 can be the party which actively initiates communication connection (first secure element), or the party which passively initiates communication connection (second secure element); if I2C periphery device 120 has to actively communicate with and connect to 7816 periphery device 110, the communicating method is similar to the above process. Therefore, 7816 periphery device 110, I2C periphery device 120, NFC chip periphery device 130 and SSD periphery device 140 can be provided with HCP protocol layer 112, HCP protocol layer 122, HCP protocol layer 132 and HCP protocol layer 142 respectively.

Meanwhile, the central function the protocol converter 200 performs in this communication process can be seen. Therefore, a secure protection for the protocol converter 200 is very necessary. A secure mode environment (i.e., a secure operating system) provided below by the platform shown in FIG. 1 can well ensure this. In this embodiment, the whole process is applied in a relatively secure TrustZone environment. In addition, with the high security of the SE itself, the security can be well ensured for the users.

Moreover, after any two SEs can communicate with each other, the communicability of each secure element is greatly expanded, the dependence of application programs of the secure element on mobile device is reduced, the independence of application programs is improved, and collaboration between industries is greatly facilitated, thus enhancing the flexibility and adaptability of the entire application development and thereby improving the flexibility, expandability and diversity of application programs of the secure element.

It is noted that in the above embodiments, after the communication process between 7816 periphery device 110 and I2C periphery device 120 is completed, the management module 300 can dynamically delete the connection channel. 7816 periphery device 110 can also establish a communication connection in NFC chip 130 and/or SD periphery device 140 as actually required.

Of course, in the communication process between SEs described herein, the HCP protocol is merely an abstract behavior description of protocol. The HCP protocol will be specifically described hereinafter by way of example.

In this HCP protocol, an ID number can be designated for individual supported communication ports according to table 1 below (mainly, the currently existing individual communication ports are defined, and other communication ports that may be required in the future can be assigned with IDs reserved in the RFU (Reserved for Future)).

TABLE 1

| Port ID | Assigned ID number |
| --- | --- |
| SIM interface | 0x01 |
| SD interface | 0x02 |
| I2C interface | 0x03 |
| NFC interface | 0x04 |
| GPRS interface | 0x05 |
| Bluetooth interface | 0x06 |
| Wifi interface | 0x07 |
| Screen interface | 0x08 |
| Keyboard interface | 0x09 |
| RFU | 0x0a-0xFF |

The identifier of a specific device at the communication port is associated with the particular implementation of the specific communication port. For example, at the Wifi port, the IP address can be used as the identifier of the specific remote device, and no detailed description is given herein. The ID number of communication port plus the identifier of the specific device can be used as the unique identifier of the target SE when establishing the connection channel in the communication process. For example, for the Wifi port, 0x07+IP address can actually indicate the identifier of the target SE for which a connection channel has to be established.

In addition, the HCP protocol indicates two message types: (1) command type; and (2) data type.

In the HCP protocol message, identifiers are shown in table 2 below with MT (message type) as an example:

TABLE 2

| MT | Data type |
| --- | --- |
| 0x00 | Command data type |
| 0x01 | Data data type |

Moreover, the main message type can be defined as shown in table 3 below, but is not limited thereto:

TABLE 3

| Message type | Chaining indicator | Command id | Data | CRC |
| --- | --- | --- | --- | --- |

The Message Type is one type for identifying the message type. Chaining indicator (data sub-package identifier) is used for indicating whether the message needs to be segmented. In order to adapt to a situation in which some SEs can not send overly long data for one time, typically, the entire message data is less than 255 bytes; if the identifier is 0x01, it means that there is subsequent message data; and if the identifier is 0x00, it means that the message is the last message data. Command ID is the command number corresponding to the specific message type, and command data is the data required for this command. Different commands correspond to different command data and different data lengths. CRC is CRC16 verification of the message and uses two bytes. In order to simply the process and complexity of this protocol, the sequence of the message data is ensured by the actual transmission protocol (e.g., TCP/IP protocol) at a lower level, and meanwhile, in order to prevent a package missing phenomenon of data during transmission, a timer can be introduced so as to calculate the time after the specific command is sent; if the time is exceeded, the command can be sent again; if the sending is failed after it is repeated three times, the sending of current commanded can be cancelled.

Command message type (in the event that MT is 0x00) is mainly used by the initiating party for establishing connection channel with the HCP management module, deleting the connection channel, configured information related to the connection channel, etc. Command/Response is configured as a pair, i.e., when a command is sent to the HCP management module, there is necessarily Response data sent from the HCP management module; and when no corresponding Response command is received, the next Command must not be sent. The specific command types can be shown below in tables 4 to 9 (corresponding Message type, Chaining indicator and CRC domain are omitted):

TABLE 4

Command of creating connection channel

| Command id (1 byte) | Port ID (1 byte) | Name (x bytes, the first byte is the length of the subsequent characters |
| --- | --- | --- |
| 0x01 | X, the corresponding communication port number | LV data, indicating the specific host identifier of the SE to be connected on the specific communication port; if to be connected to a remote backstage server, the domain can be the IP address of the remote server, and the specific number is associated with the protocol used by previous communication port |

TABLE 5

Response corresponding to creating connection channel

| Status (1 byte) | Indicating whether the command is executed successfully, wherein 0x00 indicates success, and other bytes indicates corresponding error codes |
| --- | --- |
| Channel id (1 byte) | If successfully executed, a configured Channel id is returned |

TABLE 6

Command of deleting connection channel

| Command id | Channel id |
| --- | --- |
| 0x02 | Id number of channel to be deleted |

TABLE 7

Response corresponding to deleting connection channel

| Status | Indicating whether the command is successfully executed, wherein 0x00 indicates success, and other bytes indicates corresponding error codes |
|---|---|

TABLE 8

Command of configuring connection channel

| Command id | Channel id | Parameter |
|---|---|---|
| 0x03 | Corresponding channel id number | Configuration information of specific ports (e.g., for SIM port, the baud rate or the like can be configured), which is associated with the actual communication port |

TABLE 9

Response corresponding to configuring connection channel

| Status | Indicating whether the command is successfully executed, wherein 0x00 indicates success, and other bytes indicates corresponding error codes |
|---|---|

After the channel is established, the Data message type (in the event that MT is 0x01) is used by the providers of the active party (the first secure element) and the passive party (the second secure element) for exchanging data therebetween. When a complete data command is sent, the HCP management module 300 will extract the data domain of the command and converts it into a data format that can communicate with a remote service party (i.e., the passive party). Therefore, this type of command does not need a corresponding Response. The table 10 below shows the supported commands (corresponding Message type, Chaining indicator and CRC domain are omitted):

TABLE 10 data exchanging command

| Command id | Channel id | Data |
|---|---|---|
| 0x01 | X, channel number corresponding to data transmission | Actual data exchanged between application program and remote service party (the second secure element) |

Specific application scenes of a communication between SEs will be described below by way of example.

Application example 1: for a device (e.g., cell-phone) provided with the functions of the invention, there is such an application scene: a payment application program of the user is placed in the SIM card (one of the secure elements), and corresponding bank card information is stored in the SSD card (another secure element). When the user uses the payment program to buy merchandises in a corresponding shopping environment, since there is no bank card information in the SIM card, the SIM card will create a connection channel "channel 0" to communicate with the SSD card. At this point, the user payment program will acquire commands according to AIP (e.g., bank card information) provided by service programs on the SSD card, and send these commands to the SSD card for processing via the channel 0 (i.e., the previously described steps S11 to S18). After receiving the command, the SSD card will return the generated application return data to the payment program via the channel 0 (i.e., the previously described steps S21 to S28), and the payment program will complete the following process of buying merchandises according to the acquired bank card information. In this application scene, there is no need for the bank party and the mobile operators to discuss matters about business collaboration. They only have to place the information they respectively grasp into SEs of their own, and together provide a corresponding service to a third party payment authority which controls the actual payment process, thus simplifying a complicated process such as business collaboration between the bank and operators, while also providing tremendous convenience and freedom to the third party payment authority.

Application example 2: the SSD card (the SE which actively initiates communication connection) is stored therein with transportation card application program. However, in an actual application scene of public transportation, all the corresponding transportation card reading terminals are non-contact card reading devices of 13.56M. In this situation, when the user gets on board and swipes his/her transportation card, the application program in the SSD card is activated so as to create a connection channel "channel 1" that is already configured between the NFC chip (the SE which passively accepts the communication connection) and the SSD card. The NFC chip will read a command from an on-board terminal via an antenna module it controls, and forwards it to the NFC chip. The NFC chip forwards the command to the transportation card application program on the SSD card for processing via the channel 1. After being processed by the transportation card application program on the SSD card, the command is also forwarded to the NFC chip via the channel 1, and then the NFC chip forwards the command to an on-board non-contact terminal via the antenna module so as to complete a corresponding fee deduction process of the transportation card. In this situation, while the SSD itself doesnt not have a non-contact communication capability, the protocol converter has such a non-contact capability, which expands the singleness of the communication interface of the SSD card itself. All these processes are performed at a software level, and as compared to previous NFC cell-phones which requires dedicated hardware modules that are be fixed on the SD card or the SIM card, greater flexibility, expandability and friendliness degree are undoubtedly presented.

In the above process of establishing connection channel as shown in FIG. 2, specifically, a configuration identifier is required so as to identify the first secure element (i.e., the active party SE) and the second secure element (i.e., the passive party SE). Therefore, each secure element will be configured with an identifier. As shown in table 1 above, for SEs in the terminal device that are relatively fixed, for example, they can be identified by the communication port ID number and the device ID of the secure element, and the identifier of the SE can be assigned in advance.

However, it is highly possible that the SE of the terminal device is a dynamically pluggable SE (e.g., a non-smart card or the like). In case that the SE is frequently connected to or disconnected from the secure operating system in which the protocol converter is located, each SE has to be identified dynamically and uniformly so as to facilitate establishing communication connection between any two SEs.

The method for dynamically and uniformly identifying secure element applied in the device of the embodiment shown in FIG. 2 will be further described below by way of example.

Figure 3:
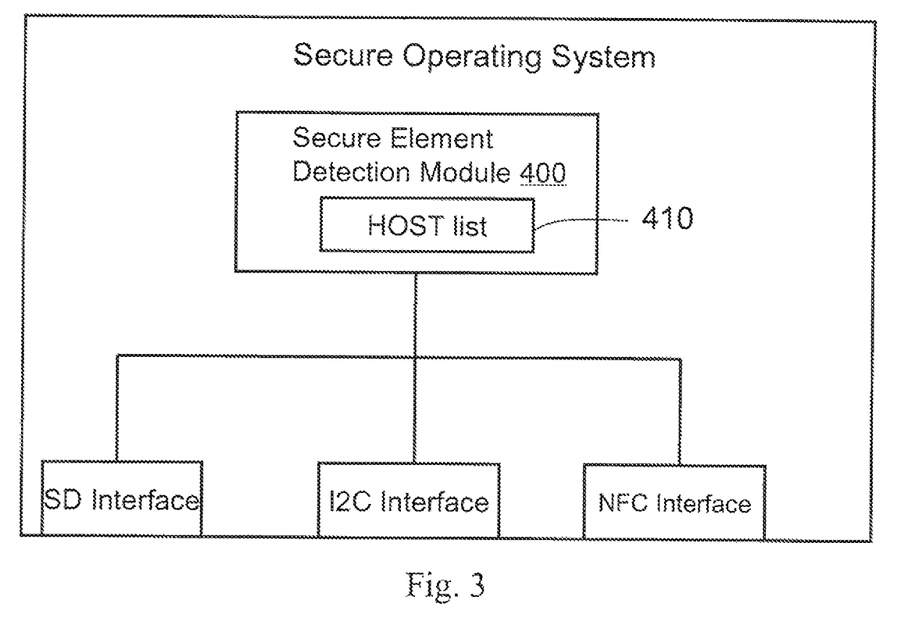
FIG. 3 is a schematic view showing a connection relationship of a secure element detection module according to an embodiment of the invention.

FIG. 3 is a schematic view showing a connection relationship of a secure element detection module according to an embodiment of the invention. In this embodiment, the secure element detection module 400 is another module comprised by the device for supporting communication between various types of secure elements as shown in FIG. 2, and is also in the secure operating system shown in FIG. 1. Specifically, the secure element detection module 400 is provided therein with a SE identifier last, e.g., HOST list 410, and the secure element detection module 400 is coupled with communication interfaces corresponding to one or more dynamically pluggable SEs, e.g., it is coupled with SD interface, I2C interface, NFC interface or the like.

In an embodiment, the number of the HOST lists 410 can be consistent with the number of the communication interfaces corresponding to dynamically pluggable SEs. Each HOST list in the secure element detection module 400 corresponds to one communication interface, thus servicing this communication interface. Specifically, each list item in each HOST list can store corresponding information of one SE, and can be numbered in sequence (e.g., beginning from 0x01). Therefore, the list item number corresponding to each SE can be at least a part of the device ID of this SE. The SE can be identified simply by combining the communication interface ID number the device ID of the SE. The number of the list items in the HOST list of the corresponding communication interface represents the number of SEs that can be supported simultaneously in this communication interface. Specifically, the default number is 16.

In another embodiment, a plurality of communication interfaces can correspond to one HOST list 410, wherein the HOST list can be divided into several sections according to the communication interface ID number, and the number of the list items in each section is correspondingly used for the SE corresponding to this communication interface.

Specifically, as shown in FIG. 3, the secure element detection module 400 can sense the connection or disconnection of SE at each communication interface.

During the process of connecting or disconnecting the SE via a certain communication interface, when the drive program on this communication interface detects a newly connected secure element, it will send the basic information of this secure element to the secure element detection module 400, which will search for an empty list item in the HOST list 410 corresponding to this communication interface (in the event that there are no empty list items, the detection module can dynamically expand the HOST list 410 so as to acquire empty list items), and store the information of this secure element (the stored information of secure element can be information for identifying the uniqueness of the secure element, e.g., CID, etc.). The number of this list item can be used as the device ID of this SE in the secure operating system, which can therefore be combined with the ID of this communication interface to form the identifier of this SE so as to identify the uniqueness thereof. If the user removes or disconnects the secure element from this communication interface, a corresponding drive program of the communication interface will send the information of the secure element to the detection module, which will find the corresponding list items in the HOST list according to the information of the secure element. In this way, the secure element is disconnected from the secure operating system.

During use (i.e., during the communication process between SEs), the secure elements that are already added to the secure operating system can establish a connection channel with other secure elements in the secure operating system via the assigned secure element identifiers and perform communication. Other secure elements can also find out the identifier and information of each secure element existing at individual communication interfaces by sending a command to the secure element detection module 400, and establish a connection channel with these secure elements as required and perform communication.

Therefore, each pluggable secure element can be identified dynamically and uniformly, and the following advantages are obtained:

Firstly, the problem of dynamic identifying when the secure elements are frequently connected to or disconnected from the secure operating system is addressed so that a definite communication means is provided to other secure elements in the secure operating system which enables them to dynamically have access to these secure elements.

Secondly, a uniform processing is performed on the assigning of identifiers for each secure element, each drive communication module's own identifying mechanism is shielded, and the processing mechanism of the secure operating system is simplified.

Thirdly, the secure executing environment of the secure operating system ensures the credibility of the entire identifying and operating process.

In the above description, the HOST list represents a module for providing application services. It can be an independent hardware computing platform such as secure elements like SIM card, smart SD card, etc., and can also be virtual secure elements realized by software and specific application programs such as human-machine interface.

The secure operating system means a closed operating system software platform running in a secure mode. All the applications running in this system are credible and legitimate. In addition, the secure operating system is independent from a multi-media operating system in a non-secure mode. The multi-media operating system in non-secure mode has no access to this operating system.

The above examples mainly describe the device and method for supporting communication between various types of secure elements according to the invention. While only some of the embodiments of the invention are described, those skilled in the art will understand that the invention can be carried out in many other ways without departing from the spirit and scope of the invention. Therefore, the illustrated examples and embodiments should be considered as schematic instead of being limiting. The invention may cover various modifications and replacements without departing from the spirit and scope of invention as defined by the appended individual claims.

The invention claimed is:

1. A device for supporting communication between various types of secure elements in a cell-phone, comprising a protocol converter, wherein the protocol converter in the cell-phone comprises:
   at least three communication interfaces for correspondingly coupling with each type of secure element; and
   a management module coupled with each communication interface;
   wherein different types of secure elements follow different bottom level communication protocols, each communication interface is configured to follow the same bottom level communication protocol as the secure element correspondingly coupled with thereof;

the management module is configured that, a plurality of first upper level communication protocol layers following a unified upper level communication protocol is provided for realizing a protocol conversion between any one of the bottom level communication protocols followed by one of the at least three communication interfaces correspondingly and the upper level communication protocol, and a connection channel for any two of the at least three communication interfaces is dynamically establish established in the management module for realizing a corresponding communication connection between the secure elements of any two different types;

wherein each of the secure elements is configured to be provided with a first bottom level communication protocol layer for following a corresponding bottom level communication protocol;

each communication interface is configured to be provided with a second bottom level communication protocol layer corresponding to a first bottom level communication protocol layer of a correspondingly coupled secure element;

wherein the management module is further configured that:

after the connection channel is established, the application command data sent by the first secure element is converted via the second upper level communication protocol layer into data that can be transmitted via a communication interface corresponding to the first secure element, and the converted data is transmitted to the protocol converter via the communication interface, wherein the management module of the protocol converter converts the application command data into data that can be transmitted via a communication interface corresponding to the second secure element based on the established connection channel, and transmits the converted data to the second secure element via the communication interface for processing; and after being processed by the second secure element, the returned application return data is transmitted to the protocol converter via a communication interface corresponding to the second secure element, wherein the management module of the protocol converter converts the application return data into data that can be transmitted via a communication interface corresponding to the first secure element based on the established connection channel, and transmits the converted data to the first secure element via the communication interface, and the first secure element resolves the application return data via the second upper level communication protocol layer;

wherein the device is further configured that:

the application command data sent by the first secure element is packaged into a first level message data by the second upper level communication protocol layer thereof according to the upper level communication protocol, and the first level message data is sent to the first bottom level communication protocol layer of the first secure element;

the first bottom level communication protocol layer packages the first level message data into bottom level message data according to the bottom level communication protocol and sends the bottom level message data to a corresponding communication interface;

the second bottom level communication protocol layer of the communication interface receives the bottom level message data and converts it into a corresponding first level message data, and sends the first level message data to the corresponding first upper level communication protocol layer of the management module;

the first upper level communication protocol layer resolves the received first level message data to identify the connection channel, and transmits the first level message data to another corresponding first upper level communication protocol layer in the connection channel via the connection channel;

the another corresponding first upper level communication protocol layer transmits at least a part of the received first level message data to the second bottom level communication protocol layer of the communication interface corresponding to the second secure element;

the second bottom level communication protocol layer of the communication interface corresponding to the second secure element packages the received first level message data into bottom level message data according to the bottom level communication protocol followed by the second secure element, and sends the bottom level message data to the first bottom level communication protocol layer of the second secure element;

the first bottom level communication protocol layer of the second secure element resolves the application command data from the bottom level message data for processing by the second secure element;

after processing in the second secure element, the second secure element sends the application return data to the first bottom level communication protocol layer thereof;

the first bottom level communication protocol layer in the second secure element packages the received application return data into bottom level message data according to the bottom level communication protocol it follows, and sends the bottom level message data to a corresponding communication interface of the protocol converter;

the second bottom level communication protocol layer in the corresponding communication interface of the protocol converter converts and packages the received bottom level message data into a first level message data and sends it to the first upper level communication protocol layer corresponding to the second secure element in the management module;

the first upper level communication protocol layer corresponding to the first secure element resolves the first level message data according to the upper level communication protocol, and based on the connection channel, forwards the first level message data corresponding to the application return data to the first upper level communication protocol layer corresponding to the first secure element;

the first upper level communication protocol layer corresponding to the first secure element forwards the first level message data corresponding to the received application return data to the second bottom level communication protocol layer of the communication interface corresponding to the first secure element;

the second bottom level communication protocol layer of the communication interface packages the received first level message data into the bottom level message data according to the bottom level communication protocol it follows, and sends the bottom level message data to the first secure element;

the first bottom level communication protocol layer of the first secure element extracts the first level message data from the received bottom level message data and sends the first level message data to the second upper communication protocol layer of the first secure element; and the second upper level communication protocol layer of the first secure element resolves the application return data according to the upper level communication protocol for process by the first secure element.

2. The device according to claim 1, characterized in that the secure elements of any two different types that communicate with each other comprise a first secure element that actively initiates the communication connection and a second secure element that passively accepts the communication connection, and the first secure element is configured with a second upper level communication protocol layer following the upper level communication protocol, and further configured to realize a protocol conversion between the bottom level communication protocol followed by the first secure element and the upper level communication protocol.

3. The device according to claim 1, device is configured to realize the establishment of communication connection between the first secure element and the management module based on the second upper level communication protocol layer in the first secure element, the first bottom level communication protocol layer in the first secure element, the second bottom level communication protocol layer in the communication interface correspondingly coupled to the first secure element and the first upper level communication protocol layer corresponding to the communication interface.

4. The device according to claim 1, the device is configured to realize the establishment of communication connection between the second secure element and the management module based on the first bottom level communication protocol layer in the second secure element, the second bottom level communication protocol layer in the communication interface correspondingly coupled to the second secure element and the first upper level communication protocol layer corresponding to the communication interface.

5. The device according to claim 1, wherein the first secure element is configured to send a request command for requesting the establishment of the connection channel, and the management module is configured to establish the corresponding connection channel according to the second secure element specified in the request command.

6. The device according to claim 5, wherein the management module is configured to assign a channel identifier for the connection channel and returns the channel identifier to the corresponding first secure element.

7. The device according to claim 1, wherein each of the communication interfaces is configured with a unique interface identifier, and each of the secure elements is configured with a device identifier, wherein a secure element identifier of each secure element is acquired by combining the device identifier of the secure element and the interface identifier of the communication interface its correspondingly couples with; and the connection channel is established at least on the basis of the secure element identifiers of the secure element.

8. The device according to claim 7, wherein each type of the secure element is a dynamically pluggable secure element, and the device comprises a secure element detection module for dynamically and uniformly identifying each dynamically pluggable secure element.

9. The device according to claim 8, wherein the secure element detection module is coupled with one or more communication interfaces corresponding to the dynamically pluggable secure element, and the secure element detection module is configured with one or more secure element list;

when the secure element detection module detects the dynamically pluggable secure element is connected from any of the communication interfaces, the information of the secure element is sent to the secure element detection module and stored in an empty list item of the secure element list corresponding to the communication interface, wherein the number of the list item is defined as the device identifier of the secure element;

when the secure element detection module detects the dynamically pluggable secure element is removed or disconnected from any of the communication interfaces, the communication interface sends the information of the secure element to the secure element detection module, and finds the corresponding list item in the secure element list corresponding to the communication interface based on the information of the secure element, and the secure element identifier of the secure element is deleted by deleting the list item.

10. The device according to claim 1, characterized in that the communication interfaces can be a 7618 interface, SD interface, NFC interface or I2C interface, and the bottom level communication protocol can be a 7618 protocol, SD protocol, NFC protocol or I2C protocol.

11. The device according to claim 1, wherein the upper level communication protocol can be HCP protocol.

12. The device according to claim 1, wherein the device operates in a secure mode or a secure operating system of the cell-phone.

13. The device according to claim 12, wherein the secure mode or the secure operating system is a secure operating environment built based on TrustZone technology.

14. The communication method between secure elements based on the device according to claim 2, comprising:

a connection channel establishing step: the first secure element sends a request command for requesting the establishment of the connection channel, and the management module establishes the corresponding connection channel according to the second secure element specified in the request command;

an application command data sending step: the application command data sent by the first secure element is converted via the second upper level communication protocol layer into data that can be transmitted via a communication interface corresponding to the first secure element, and the converted data is transmitted to the protocol converter via the communication interface, wherein the management module of the protocol converter converts the application command data into data that can be transmitted via a communication interface corresponding to the second secure element based on the established connection channel, and transmits the converted data to the second secure element via the communication interface for processing; and an application return data returning step: after the second secure element at least processes the application command data, the application return data that needs to be returned is transmitted to the protocol converter via a communication interface corresponding to the second secure element, wherein the management module of the protocol converter converts the application return data into data that can be transmitted via a communication interface corresponding to the first secure element based on the established connection channel, and transmits the converted data to the first secure element via the communication interface, and the first secure element resolves the application return data via the second upper level communication protocol layer.

15. The communication method between secure elements according to claim 14, wherein each of the communication interfaces is configured with a unique interface identifier, and each of the secure elements is configured with a device identifier, wherein a secure element identifier of each secure element is acquired by combining the device identifier of the secure element and the interface identifier of the communication interface its correspondingly couples with;

the connection channel is established at least on the basis of the secure element identifiers of the secure elements.

16. The communication method between secure elements according to claim 15, wherein the secure element comprises a dynamically pluggable secure element, and the device comprises a secure element detection module for dynamically and uniformly identifying each dynamically pluggable secure element.

17. The communication method between secure elements according to claim 16, wherein the secure element detection module is coupled with one or more communication interfaces corresponding to the dynamically pluggable secure element, and the secure element detection module is configured with one or more secure element list;

when the secure element detection module detects the dynamically pluggable secure element is connected from any of the communication interfaces, the information of the secure element is sent to the secure element detection module and stored in an empty list item of the secure element list corresponding to the communication interface, wherein the number of the list item is defined as the device identifier of the secure element;

when the secure element detection module detects the dynamically pluggable secure element is removed or disconnected from any of the communication interfaces, the communication interface sends the information of the secure element to the secure element detection module, and finds the correspond corresponding list item in the secure element list corresponding to the communication interface based on the information of the secure element, and the secure element identifier of the secure element is deleted by deleting the list item.

18. The communication method between secure elements according to claim 14, wherein the method operates in a secure mode or a secure operating system in the cell-phone.

19. A cell-phone, comprising:
various types of secure elements, and
a protocol converter;
wherein the protocol converter comprises:
at least three communication interfaces for correspondingly coupling with each type of secure element; and
a management module coupled with each communication interface;
wherein different types of secure elements follow different bottom level communication protocols, each communication interface is configured to follow the same bottom level communication protocol as the secure element correspondingly coupled with thereof;
the management module is configured that, a plurality of first upper level communication protocol layers following a unified upper level communication protocol is provided for realizing a protocol conversion between anyone of the bottom level communication protocols followed by one of the at least three communication interfaces correspondingly and the upper level communication protocol, and a connection channel for any two of the at least three communication interfaces is dynamically established in the management module for realizing a corresponding communication connection between the secure elements of any two different types;
wherein each of the secure elements is configured to be provided with a first bottom level communication protocol layer for following a corresponding bottom level communication protocol;
each communication interface is configured to be provided with a second bottom level communication protocol layer corresponding to a first bottom level communication protocol layer of a correspondingly coupled secure element;
wherein the management module is further configured that:
after the connection channel is established, the application command data sent by the first secure element is converted via the second upper level communication protocol layer into data that can be transmitted via a communication interface corresponding to the first secure element, and the converted data is transmitted to the protocol converter via the communication interface, wherein the management module of the protocol converter converts the application command data into data that can be transmitted via a communication interface corresponding to the second secure element based on the established connection channel, and transmits the converted data to the second secure element via the communication interface for processing; and
after being processed by the second secure element, the returned application return data is transmitted to the protocol converter via a communication interface corresponding to the second secure element, wherein the management module of the protocol converter converts the application return data into data that can be transmitted via a communication interface corresponding to the first secure element based on the established connection channel, and transmits the converted data to the first secure element via the communication interface, and the first secure element resolves the application return data via the second upper level communication protocol layer;
wherein the device is further configured that:
the application command data sent by the first secure element is packaged into a first level message data by the second upper level communication protocol layer thereof according to the upper level communication protocol, and the first level message data is sent to the first bottom level communication protocol layer of the first secure element;
the first bottom level communication protocol layer packages the first level message data into bottom level message data according to the bottom level communication protocol and sends the bottom level message data to a corresponding communication interface;
the second bottom level communication protocol layer of the communication interface receives the bottom level message data and converts it into a corresponding first level message data, and sends the first level message data to the corresponding first upper level communication protocol layer of the management module;
the first upper level communication protocol layer resolves the received first level message data to identify the connection channel, and transmits the first level message data to another corresponding first upper level communication protocol layer in the connection channel via the connection channel;

the another corresponding first upper level communication protocol layer transmits at least a part of the received first level message data to the second bottom level communication protocol layer of the communication interface corresponding to the second secure element;

the second bottom level communication protocol layer of the communication interface corresponding to the second secure element packages the received first level message data into bottom level message data according to the bottom level communication protocol followed by the second secure element, and sends the bottom level message data to the first bottom level communication protocol layer of the second secure element;

the first bottom level communication protocol layer of the second secure element resolves the application command data from the bottom level message data for processing by the second secure element;

after processing in the second secure element, the second secure element sends the application return data to the first bottom level communication protocol layer thereof;

the first bottom level communication protocol layer in the second secure element packages the received application return data into bottom level message data according to the bottom level communication protocol it follows, and sends the bottom level message data to a corresponding communication interface of the protocol converter;

the second bottom level communication protocol layer in the corresponding communication interface of the protocol converter converts and packages the received bottom level message data into a first level message data and sends it to the first upper level communication protocol layer corresponding to the second secure element in the management module;

the first upper level communication protocol layer corresponding to the first secure element resolves the first level message data according to the upper level communication protocol, and based on the connection channel, forwards the first level message data corresponding to the application return data to the first upper level communication protocol layer corresponding to the first secure element;

the first upper level communication protocol layer corresponding to the first secure element forwards the first level message data corresponding to the received application return data to the second bottom level communication protocol layer of the communication interface corresponding to the first secure element;

the second bottom level communication protocol layer of the communication interface packages the received first level message data into the bottom level message data according to the bottom level communication protocol it follows, and sends the bottom level message data to the first secure element;

the first bottom level communication protocol layer of the first secure element extracts the first level message data from the received bottom level message data and sends the first level message data to the second upper communication protocol layer of the first secure element; and the second upper level communication protocol layer of the first secure element resolves the application return data according to the upper level communication protocol for process by the first secure element.

* * * * *